(12) United States Patent
Park et al.

(10) Patent No.: US 10,670,941 B2
(45) Date of Patent: Jun. 2, 2020

(54) OPTICAL MODULATION DEVICE AND METHOD OF OPERATING THE SAME

(71) Applicant: SAMSUNG ELECTRONICS CO., LTD., Suwon-si (KR)

(72) Inventors: Junghyun Park, Seoul (KR); Jisoo Kyoung, Seoul (KR); Sunil Kim, Osan-si (KR); Changgyun Shin, Anyang-si (KR); Byunggil Jeong, Anyang-si (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/971,044

(22) Filed: May 4, 2018

(65) Prior Publication Data

US 2019/0018299 A1 Jan. 17, 2019

(30) Foreign Application Priority Data

Jul. 13, 2017 (KR) .......................... 10-2017-0089156

(51) Int. Cl.
*G02F 1/29* (2006.01)
*G02B 5/00* (2006.01)
*G02F 1/01* (2006.01)

(52) U.S. Cl.
CPC .............. *G02F 1/29* (2013.01); *G02B 5/008* (2013.01); *G02F 1/0123* (2013.01); *G02F 2201/12* (2013.01); *G02F 2201/18* (2013.01); *G02F 2202/20* (2013.01); *G02F 2203/02* (2013.01); *G02F 2203/10* (2013.01); *G02F 2203/24* (2013.01); *G02F 2203/50* (2013.01)

(58) Field of Classification Search
CPC .......... G02F 1/29; G02F 1/292; G02F 1/1334; G02B 26/005; G02B 26/004; G02B 26/0841
USPC ......................................................... 359/316
See application file for complete search history.

(56) References Cited

U.S. PATENT DOCUMENTS

| | | | |
|---|---|---|---|
| 8,909,001 B2 | 12/2014 | Miyazaki et al. | |
| 9,057,872 B2 * | 6/2015 | Mignard | G02B 26/001 |
| 9,632,216 B2 | 4/2017 | Han et al. | |
| 2003/0059147 A1 | 3/2003 | Berini | |
| 2009/0073547 A1 | 3/2009 | Fujimori | |

(Continued)

OTHER PUBLICATIONS

Junghyun Park et al., "Dynamic Reflection Phase and Polarization Control in Metasurfaces", Nano Letters, vol. 17, pp. 407-413, Dec. 5, 2016. (7 pages total).

(Continued)

*Primary Examiner* — Mohammed A Hasan
(74) *Attorney, Agent, or Firm* — Sughrue Mion, PLLC

(57) ABSTRACT

Provided are an optical modulation device and a method of operating the same. The optical modulation device may include a nano-antenna, a conductor, and an active layer located between the nano-antenna and the conductor. The optical modulation device may further include a first dielectric layer located between the active layer and the conductor and a second dielectric layer located between the active layer and the nano-antenna. The optical modulation device may further include a signal applying unit configured to independently apply an electrical signal to at least two of the nano-antenna, the active layer, and the conductor.

33 Claims, 18 Drawing Sheets

(56) References Cited

U.S. PATENT DOCUMENTS

| | | | |
|---|---|---|---|
| 2010/0117104 A1* | 5/2010 | Murata | H01S 5/0265 |
| | | | 257/94 |
| 2014/0185122 A1* | 7/2014 | Han | B82Y 20/00 |
| | | | 359/238 |
| 2016/0054599 A1 | 2/2016 | Oh et al. | |
| 2016/0223723 A1 | 8/2016 | Han et al. | |
| 2017/0023803 A1 | 1/2017 | Han et al. | |
| 2017/0031183 A1 | 2/2017 | Han et al. | |
| 2017/0168324 A1 | 6/2017 | Kim et al. | |
| 2017/0184881 A1 | 6/2017 | Loertscher et al. | |
| 2018/0059505 A1* | 3/2018 | Kyoung | G02F 1/292 |
| 2018/0292681 A1 | 10/2018 | Han et al. | |
| 2019/0033682 A1 | 1/2019 | Shirmanesh et al. | |

OTHER PUBLICATIONS

Yao-Wei Huang et al., "Gate-tunable conducting oxide metasurfaces", Nano Letters, vol. 16, pp. 1-13, Aug. 26, 2016. (13 pages total).

Vincenzo Giannini et al., "Plasmonic Nanoantennas: Fundamentals and Their Use in Controlling the Radiative Properties of Nanoemitters", Chemical Reviews, vol. 111, No. 6, American Chemical Society Publications, XP055528857, Jun. 8, 2011, pp. 3888-3912.

Communication dated Dec. 13, 2018, issued by the European Patent Office in counterpart European Application No. 18175357.5.

\* cited by examiner

< COMPARATIVE EXAMPLE >

< COMPARATIVE EXAMPLE >

OPTICAL MODULATION DEVICE AND METHOD OF OPERATING THE SAME

CROSS-REFERENCE TO RELATED APPLICATION

This application claims priority from Korean Patent Application No. 10-2017-0089156, filed on Jul. 13, 2017, in the Korean Intellectual Property Office, the disclosure of which is incorporated herein in its entirety by reference.

BACKGROUND

1. Field

Apparatuses and methods consistent with exemplary embodiments relate to optical modulation devices and methods of operating the same.

2. Description of the Related Art

Optical devices for changing the transmission/reflection characteristics, phase, amplitude, polarization, intensity, path, etc. of light are used in any of various optical apparatuses. In order to control such properties of light in a desired manner in an optical system, optical modulators having various structures have been suggested. For example, liquid crystals having optical anisotropy or a microelectromechanical system (MEMS) structure using a micromechanical movement of a light blocking/reflecting element is used in an optical modulator. Recently, attempts have been made to apply a nano-structure using surface plasmon resonance stimulated by incident light to an optical device.

SUMMARY

One or more exemplary embodiments may provide optical modulation devices for modulating light electrically.

One or more exemplary embodiments may provide optical modulation devices for modulating light by using surface plasmon resonance.

One or more exemplary embodiments may provide optical modulation devices including a plasmonic nano-antenna or an array of plasmonic nano-antennas.

One or more exemplary embodiments may provide methods of operating the optical modulation devices.

One or more exemplary embodiments may provide apparatuses including the optical modulation devices.

Additional exemplary aspects will be set forth in part in the description which follows and, in part, will be apparent from the description, or may be learned by practice of the presented exemplary embodiments.

According to an aspect of an exemplary embodiment, an optical modulation device includes: a nano-antenna; a conductor facing the nano-antenna; an active layer located between the nano-antenna and the conductor, at least one property of the active layer being variable based on a voltage applied thereto; a first dielectric layer located between the active layer and the conductor; a second dielectric layer located between the active layer and the nano-antenna; and a signal applying unit configured to independently apply an electrical signal to at least two of the nano-antenna, the active layer, and the conductor.

The signal applying unit may be configured to independently apply a first voltage to the conductor and a second voltage to the nano-antenna.

The signal applying unit may include: a first voltage applying unit configured to apply the first voltage between the conductor and the active layer; and a second voltage applying unit configured to apply the second voltage between the active layer and the nano-antenna.

The signal applying unit may be configured to independently apply a first voltage to the conductor, a second voltage to the active layer, and a third voltage to the nano-antenna.

The signal applying unit may be configured to apply a first voltage to the conductor, a second voltage to the active layer, and a third voltage to the nano-antenna, and at least one of the first voltage may and the third voltage is different from the second voltage.

The second voltage may be a reference voltage for the first and third voltages.

The second voltage may be a ground voltage.

The active layer may include a first charge concentration varying region and a second charge concentration varying region, formed by application of the electrical signal by the signal applying unit, and the first charge concentration varying region may be located adjacent to the first dielectric layer, and the second charge concentration varying region may be located adjacent to the second dielectric layer.

The conductor may be a back reflector electrode located under the active layer.

The conductor may be a metal layer.

The active layer may be a first active layer, and the optical modulation device may further include a second active layer located between the conductor and the first dielectric layer, the second active layer electrically contacting the conductor.

The active layer may be a first active layer, and the optical modulation device may further include a second active layer between the first dielectric layer and the second dielectric layer, and an intermediate dielectric layer may be located between the first and second active layers.

The active layer may have a multi-layer structure including a lower layer and an upper layer, and the lower layer and the upper layer may include different materials or have different doping characteristics.

A plurality of the conductors may be spaced apart from one another, a plurality of the nano-antennas may be spaced apart from one another, and the active layer may be located between the plurality of conductors and the plurality of nano-antennas.

The optical modulation device may be configured to apply different voltages to at least two of the plurality of conductors, and apply different voltages to at least two of the plurality of nano-antennas.

The signal applying unit may be configured to apply a voltage independently to each of the plurality of conductors, and apply a voltage independently to each of the plurality of nano-antennas.

The plurality of conductors may include a first conductor and a second conductor, and the plurality of nano-antennas may include a first nano-antenna corresponding to the first conductor and a second nano-antenna corresponding to the second conductor, wherein a first voltage may be applied to the first conductor, and, independently, a second voltage may be applied to the first nano-antenna, and a third voltage may be applied to the second conductor, and, independently, a fourth voltage may be applied to the second nano-antenna.

The conductor, the first dielectric layer, the active layer, the second dielectric layer, and the nano-antenna may constitute one unit device, and a plurality of the unit devices may be arranged.

The plurality of unit devices may be arranged in a one-dimensional (1D) or two-dimensional (2D) array.

One nano-antenna may be located to correspond to one conductor, or a plurality of the nano-antennas may be located to correspond to one conductor.

The active layer may include an electro-optic material having a permittivity which varies according to an electrical signal applied to the active layer.

The active layer may include at least one of a transparent conductive oxide and a transition metal nitride.

At least one of the first and second dielectric layers may include at least one of an insulating silicon compound and an insulating metal compound.

The optical modulation device may induce phase modulation of light reflected by the nano-antenna.

The optical modulation device may be configured to change a reflection phase of incident light by up to 360°.

According to an aspect of another exemplary embodiment, an optical apparatus includes the optical modulation device.

The optical apparatus may be configured to steer a beam in a one-dimensional (1D) or two-dimensional (2D) manner by using the optical modulation device.

The optical apparatus may include at least one of a light detection and ranging (LiDAR) apparatus, a three-dimensional (3D) image acquisition apparatus, a holographic display apparatus, and a structured light generating apparatus.

According to an aspect of another exemplary embodiment, an optical modulation device includes: a plurality of conductive elements spaced apart from one another; a plurality of nano-antennas facing the plurality of conductive elements; an active layer located between the plurality of conductive elements and the plurality of nano-antennas, where the active layer is spaced apart from the plurality of conductive elements and from the plurality of nano-antennas and at least one property of the active layer is variable based on a voltage applied thereto; and a voltage applying unit configured to independently apply a voltage to each of the plurality of conductive elements and each of the plurality of nano-antennas, wherein the voltage independently applied to each of the plurality of conductive elements causes a change in a charge concentration occurring in a first region of the active layer due and the voltage independently applied to each of the plurality of nano-antennas causes a change in a charge concentration occurring in a second region of the active layer, wherein the change in the charge concentration occurring in the first region and the change in the charge concentration occurring in the second region modulate light incident on the optical modulation device.

The voltage applying unit may be configured to apply different voltages to at least two of the plurality of conductive elements, and, independently, apply different voltages to at least two of the plurality of nano-antennas.

The plurality of conductive elements may include a first conductive element and a second conductive element, and the plurality of nano-antennas may include a first nano-antenna corresponding to the first conductive element and a second nano-antenna corresponding to the second conductive element, wherein the voltage applying unit may be configured to independently apply a voltage to each of the first conductive element, the first nano-antenna, the second conductive element, and the second nano-antenna.

The optical modulation device may further include: a first insulating layer located between the plurality of conductive elements and the active layer; and a second insulating layer located between the plurality of nano-antennas and the active layer.

The plurality of nano-antennas may be arranged in a one-dimensional (1D) array, and the optical modulation device may be configured to steer a beam to a 1D direction.

The plurality of nano-antennas may be arranged in a two-dimensional (2D) array, and the optical modulation device may be configured to steer a beam to a 2D direction.

According to an aspect of another exemplary embodiment, an optical apparatus includes the optical modulation device.

The optical apparatus may be configured to steer a beam in a one-dimensional (1D) or two-dimensional (2D) manner by using the optical modulation device.

The optical apparatus may include at least one of, for example, a light detection and ranging (LiDAR) apparatus, a three-dimensional (3D) image acquisition apparatus, a holographic display apparatus, and a structured light generating apparatus.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
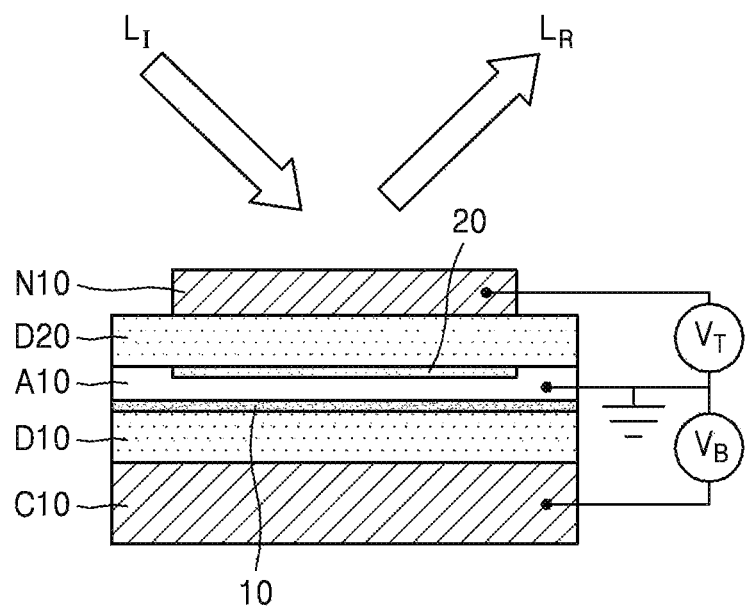
FIG. 1 is a cross-sectional view of an optical modulation device according to an exemplary embodiment.

Various exemplary embodiments will now be described more fully with reference to the accompanying drawings in which exemplary embodiments are shown.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Expressions such as "at least one of", when preceding a list of elements, modify the entire list of elements and do not modify the individual elements of the list.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of exemplary embodiments. As used herein, the singular forms "a", "an", and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to cross-sectional illustrations that are schematic illustrations of idealized embodiments (and intermediate structures) of exemplary embodiments. As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The present disclosure will now be described more fully with reference to the accompanying drawings, in which exemplary embodiments are shown. In the drawings, widths and thicknesses of layers and regions may be exaggerated for clarity and convenience of explanation. The same reference numerals denote the same elements throughout the detailed description.

FIG. 1 is a cross-sectional view of an optical modulation device according to an exemplary embodiment.

Referring to FIG. 1, the optical modulation device may include a conductor C10 and a nano-antenna N10 facing the conductor C10. The nano-antenna N10 may be a plasmonic nano-antenna. An active layer A10 may be located between the conductor C10 and the nano-antenna N10. The active layer A10 may be a layer whose properties vary according to an electrical condition. For example, at least one property of the active layer A10 may vary based on a voltage applied thereto. A permittivity of the active layer A10 may vary according to an electrical condition (e.g., applied voltage) related to the active layer A10 and a region surrounding the active layer A10. A change in a permittivity of the active layer A10 may be caused by a change in charge concentrations (charge densities) of regions in the active layer A10. In other words, a permittivity of the active layer A10 may be changed when charge concentrations of regions in the active layer A10 are changed. A first dielectric layer D10 may be located between the conductor C10 and the active layer A10. A second dielectric layer D20 may be located between the active layer A10 and the nano-antenna N10. The first dielectric layer D10 may be a first insulating layer for electrically insulating the conductor C10 from the active layer A10, and the second dielectric layer D20 may be a second insulating layer for electrically insulating the nano-antenna N10 from the active layer A10.

The optical modulation device according to the present exemplary embodiment may include a signal applying unit configured to independently apply an electrical signal to at least two of the nano-antenna N10, the active layer A10, and the conductor C10. The signal applying unit may be configured to independently apply a voltage to each of the conductor C10 and the nano-antenna N10. For example, the signal applying unit may include a first voltage applying unit VB for applying a first voltage between the conductor C10 and the active layer A10 and a second voltage applying unit VT for applying a second voltage between the active layer A10 and the nano-antenna N10. In this case, the active layer A10 may be grounded.

The active layer A10 may include a first charge concentration varying region 10 where a charge concentration varies according to a voltage applied between the conductor C10 and the active layer A10 by the first voltage applying unit VB. Also, the active layer A10 may include a second charge concentration varying region 20 in which a charge concentration varies according to a voltage applied between the active layer A10 and the nano-antenna N10 by the second voltage applying unit VT. The first charge concentration varying region 10 may be located adjacent to the first dielectric layer D10, and the second charge concentration varying region 20 may be located adjacent to the second dielectric layer D20. The first charge concentration varying region 10 and the second charge concentration varying region 20 may be controlled independently.

The nano-antenna N10 may be an antenna having a nano-structure and configured to capture energy by converting light of a specific wavelength (or frequency) (including incident light and visible and invisible electromagnetic waves) into localized surface plasmon resonant light. The nano-antenna N10 may be a conductive layer pattern (e.g., a metal layer pattern), and the conductive layer pattern may contact a non-conductive layer (e.g., a dielectric layer). Plasmon resonance may occur at an interface between the conductive layer pattern and the non-conductive layer. In this case, the non-conductive layer may be the second dielectric layer D20, or a layer different from the second dielectric layer D20. For convenience, the following will be explained on the assumption that the conductive layer pattern is the nano-antenna N10. An interface at which surface plasmon resonance occurs, such as the interface between the conductive layer pattern and the non-conductive layer, may be referred to as a "meta-surface" or a "meta-structure".

The nano-antenna N10 may be formed of a conductive material and may have a sub-wavelength dimension. The term 'sub-wavelength dimension' refers to a dimension smaller than an operating wavelength of the nano-antenna N10. At least one shape dimension of a thickness, a horizontal length, and a vertical length of the nano-antenna N10, an interval between adjacent nano-antennas N10, and a period (i.e., length+interval) of nano-antennas N10 may be a sub-wavelength dimension. A resonance wavelength may vary according to a shape and a dimension of the nano-antenna N10. The operating wavelength may be about 1,550 nm and a period (an example of the sub-wavelength dimension) of the nano-antennas may be about 500 nm, but these are merely specific examples, and the present disclosure is not limited thereto.

A conductive material used to form the nano-antenna N10 may be a metal material having high conductivity and capable of causing surface plasmon excitation. For example, the nano-antenna N10 may be formed of at least one metal selected from the group consisting of copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), and gold (Au), or an alloy including at least one of the metals. Alternatively, the nano-antenna N10 may include a thin film in which metal nano-particles such as Au or Ag are dispersed, a carbon nano-structure such as graphene or carbon nanotubes (CNTs), a conductive polymer such as poly(3,4-ethylenedioxythiophene) (PEDOT), polypyrrole (PPy), or poly(3-hexylthiophene) (P3HT), or a conductive oxide.

The active layer A10 may be a layer whose properties vary according to an electrical condition (e.g., voltage condition) applied to the active layer A10, and may function as an electrode. For example, the active layer A10 may be a layer having a permittivity that varies according to an electrical condition (e.g., voltage condition applied thereto). By way of example, concentrations (charge densities) of regions in the active layer A10 may be changed due to an electric field applied to the active layer A10, and thus a permittivity of the active layer A10 may be changed. For example, the active layer A10 may include a transparent conductive oxide (TCO) such as indium tin oxide (ITO), indium zinc oxide (IZO), aluminum zinc oxide (AZO), gallium zinc oxide (GZO), aluminum gallium zinc oxide (AGZO), or gallium indium zinc oxide (GIZO). Alternatively, the active layer A10 may include a transition metal nitride such as TiN, ZrN, HfN, or TaN. The active layer A10 may include an electro-optic (EO) material having an effective permittivity that is changed when an electrical signal is applied thereto. The EO material may include a crystalline material such as LiNbO3, LiTaO3, potassium tantalate niobate (KTN), or lead zirconate titanate (PZT), or any of various polymers having EO characteristics.

A permittivity of the active layer A10 may vary according to a wavelength. A relative permittivity $\varepsilon r$ to a permittivity $\varepsilon 0$ of vacuum may be defined as a dielectric constant, and a real part of the dielectric constant of the active layer A10 may be equal to 0 in a predetermined wavelength band. A wavelength band in which the real part of the dielectric constant is equal or approximately equal to 0 is referred to as an epsilon near zero (ENZ) wavelength band. A dielectric constant of most materials may be a function of a wavelength and may be indicated as a complex number. The dielectric constant of vacuum is 1 and the real part of the dielectric constant of a dielectric material is a positive number greater than 1. When a metal is used, the real part of the dielectric constant may be a negative number. The dielectric constant of most materials has a value greater than 1 in most wavelength bands whereas the real part of the dielectric constant may be equal to 0 in a specific wavelength. It is known that when the real part of the dielectric constant is equal or approximately equal to 0, the dielectric material exhibits specific optical properties. The optical modulation device of this exemplar embodiment may set an operating wavelength band as an area including an ENZ wavelength band of the active layer A10. A range in which optical modulation performance is adjusted may be increased by setting a resonance wavelength band of the nano-antenna A10 to be similar to an ENZ wavelength band of the active layer A10. The ENZ wavelength band of the active layer A10 may vary according to characteristics (e.g., charge concentrations) of the first and second charge concentration varying regions 10 and 20.

The conductor C10 may include a conductive material and may function as an electrode. The conductive material of the conductor C10 may be the same as or similar to the conductive material of the nano-antenna N10. For example, the conductor C10 may include at least one metal selected from the group consisting of Cu, Al, Ni, Fe, Co, Zn, Ti, Ru, Rh, Pd, Pt, Ag, Os, Ir, and Au, or an alloy including at least one of the metals. Alternatively, the conductor C10 may include a thin film in which metal nano-particles such as Au or Ag are dispersed, a carbon nano-structure such as graphene or CNTs, a conductive polymer such as PEDOT, PPy, or P3HT, or a conductive oxide.

The conductor C10 may be a back reflector electrode located under the active layer A10. Accordingly, the conductor C10 may reflect light and may function as an electrode. The conductor C10 may be optically coupled to the nano-antenna N10, and light may be reflected due to an optical interaction between the nano-antenna N10 and the conductor C10. Any conductor (e.g., conductive element) corresponding to the conductor C10 described below with reference to FIGS. 8 through 18 may be a back reflector electrode.

Each of the first dielectric layer D10 and the second dielectric layer D20 may include an insulating material (e.g., a dielectric material). At least one of the first and second dielectric layers D10 and D20 may include at least one of an insulating silicon compound and an insulating metal compound. The insulating silicon compound may include, for example, silicon oxide (SiOx), silicon nitride (SixNy), or silicon oxynitride (SiON), and the insulating metal compound may include, for example, aluminum oxide (Al2O3), hafnium oxide (HfO), zirconium oxide (ZrO), or hafnium silicon oxide (HfSiO). The above detailed materials of the first and second dielectric layers D10 and D20 are exemplary and the present disclosure is not limited thereto. The first dielectric layer D10 and the second dielectric layer D20 may be formed of the same material or of different materials.

A voltage may be independently applied between the active layer A10 and the conductive layer C10 and between the active layer A10 and the nano-antenna N10 by using the first voltage applying unit VB and the second voltage applying unit VT. When the active layer A10 is grounded, that is, when a voltage of the active layer A10 is 0 V, a voltage applied to the conductor C10 by the first voltage applying unit VB may be a positive (+) voltage or a negative (−) voltage. When a voltage applied to the conductor C10 is a positive (+) voltage, the first charge concentration varying region 10 may be a charge accumulation region, and when a voltage applied to the conductor C10 is a negative (−) voltage, the first charge concentration varying region 10 may be a charge depletion region. A voltage of 0 V may also be applied to the conductor C10. Also, a voltage applied to the nano-antenna N10 by the second voltage applying unit VT may be a positive (+) voltage or a negative (−) voltage. When a voltage applied to the nano-antenna N10 is a positive voltage, the second charge concentration varying region 20 may be a charge accumulation region, and when a voltage applied to the nano-antenna N10 is a negative (−) voltage, the second charge concentration varying region 20 may be a charge depletion region. A voltage of 0 V may also be applied to the nano-antenna N10.

Since a voltage applied to the conductor C10 and the nano-antenna N10 is independently adjusted, characteristics of the first and second charge concentration varying regions 10 and 20 may be independently controlled. Accordingly, either of the first and second charge concentration varying regions 10 and 20 may be a charge accumulation region, and the other may be a charge depletion region. Alternatively, both the first and second charge concentration varying regions 10 and 20 may be charge accumulation regions or charge depletion regions. Even when both the first and second charge concentration varying regions 10 and 20 are charge accumulation regions or charge depletion regions, charge concentrations of the first and second charge concentration varying regions 10 and 20 may be independently controlled.

Assuming that a majority of the carriers of the active layer A10 are negative (−) charges, in other words, that the active layer A10 is an N-type electrode or an N-doped material layer, when a voltage applied to the conductor C10 is a positive voltage, the first charge concentration varying region 10 may be an electron accumulation region, and when a voltage applied to the conductor C10 is a negative voltage, the first charge concentration varying region 10 may be an electron depletion region. Likewise, when a voltage applied to the nano-antenna N10 is a positive voltage, the second charge concentration varying region 20 may be an electron accumulation region, and when a voltage applied to the nano-antenna N10 is a negative voltage, the second charge concentration varying region 20 may be an electron depletion region. Alternately, a majority of the carriers of the active layer A10 may be positive charges. In other words, the active layer A10 may be a P-type electrode or a P-doped material layer. In this case, when a voltage applied to the conductor C10 is a positive voltage, the first charge concentration varying region 10 may be a hole depletion region, and when a voltage applied to the conductor C10 is a negative voltage, the first charge concentration varying region 10 may be a hole accumulation region. Likewise, when a voltage applied to the nano-antenna N10 is a positive voltage, the second charge concentration varying region 20 may be a hole depletion region, and when a voltage applied to the nano-antenna N10 is a negative voltage, the second charge concentration varying region 20 may be a hole accumulation region.

The conductor C10 may be referred to as a first gate electrode, and the nano-antenna N10 may be referred to as a second gate electrode. The first dielectric layer D10 may be referred to as a first gate insulating layer, and the second dielectric layer D20 may be referred to as a second gate insulating layer. A voltage applied to the conductor C10 may be referred to as a first gate voltage, and a voltage applied to the nano-antenna N10 may be referred to as a second gate voltage. Since the first and second gate voltages may be independently controlled, it may be stated that the optical modulation device of the present exemplary embodiment has a double electrode structure (e.g., a double gate electrode structure).

Characteristics of the first and second charge concentration varying regions 10 and 20 may be independently controlled by using the first voltage applying unit VB and the second voltage applying unit VT, and optical modulation characteristics of the optical modulation device may be changed correspondingly. Optical modulation characteristics may be controlled by an electro-optic interaction among the nano-antenna N10, the active layer A10, and the conductor C10 and a change in characteristics of the active layer A10. For example, when predetermined incident light LI is reflected by the nano-antenna N10, characteristics of reflected light LR may vary according to characteristics of the first and second charge concentration varying regions 10 and 20. In other words, characteristics of the reflected light LR may vary according to a voltage applied to the conductor C10 by the first voltage applying unit VB and a voltage applied to the nano-antenna N10 by the second voltage applying unit VT. Since characteristics of the first and second charge concentration varying regions 10 and 20 are independently controlled, optical modulation characteristics may be significantly improved and problematic noise or the like may be reduced, which will be explained below in detail with reference to FIGS. 6 and 7.

Figure 2:
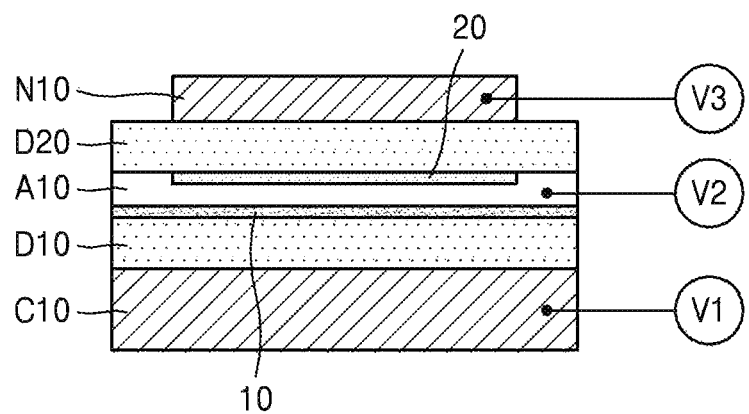
FIG. 2 is a cross-sectional view of an optical modulation device according to another exemplary embodiment.

Although the "signal applying unit" for applying an electrical signal to the optical modulation device includes the first voltage applying unit VB connected between the conductor C10 and the active layer A10 and the second voltage applying unit VT connected between the active layer A10 and the nano-antenna N10, and the active layer A10 is grounded in FIG. 1, a configuration of the signal applying unit may be changed, as shown in FIG. 2, for example.

FIG. 2 is a cross-sectional view of an optical modulation device according to another exemplary embodiment.

Referring to FIG. 2, a signal applying unit for applying an electrical signal to the optical modulation device may be configured to independently apply a voltage to each of the conductor C10, the active layer A10, and the nano-antenna N10. The signal applying unit may include a first voltage applying unit V1 for applying a first voltage to the conductor C10, a second voltage applying unit V2 for applying a second voltage to the active layer A10, and a third voltage applying unit V3 for applying a third voltage to the nano-antenna N10. The first voltage may be greater or less than the second voltage. Also, the third voltage may be greater or less than the second voltage. At least one of the first voltage and the third voltage may be the same as the second voltage. The second voltage may be a reference voltage for the first and third voltages. The second voltage may be, optionally, a ground voltage, which may be similar to a case where the active layer A10 is grounded in FIG. 1.

Since a voltage is independently applied to each of the conductor C10, the active layer A10, and the nano-antenna N10, characteristics of the first and second charge concentration varying regions 10 and 20 may be independently controlled by potential differences among the conductor C10, the active layer A10, and the nano-antenna N10.

Figure 3:
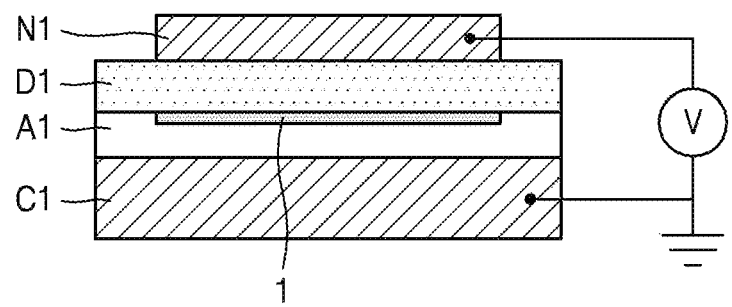
FIG. 3 is a cross-sectional view of an optical modulation device according to a comparative example.

FIG. 3 is a cross-sectional view of an optical modulation device according to a comparative example.

Referring to FIG. 3, the optical modulation device according to the comparative example may include a nano-antenna N1 located over a conductor C1, an active layer A1 contacting the conductor C1, and a dielectric layer D1 located between the active layer A1 and the nano-antenna N1. Also, the optical modulation device according to the comparative example includes a voltage applying unit V for applying a voltage to the nano-antenna N1. The voltage applying unit V is connected between the conductor C1 and the nano-antenna N1, and the conductor C1 is grounded.

In this case, one charge concentration varying region 1 may be formed in the active layer A1 according to a voltage applied between the conductor C1 and the nano-antenna N1 by the voltage applying unit V. The charge concentration varying region 1 may be formed adjacent to the dielectric layer D1. It may be stated that the optical modulation device according to the comparative example has a single gate electrode structure.

Figure 4:
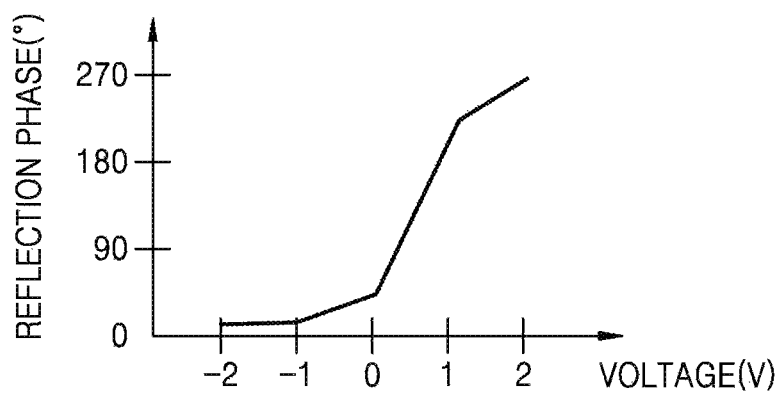
FIG. 4 is a graph showing a phase change of reflected light according to a voltage application condition of the optical modulation device according to the comparative example of FIG. 3.

FIG. 4 is a graph showing a phase change of reflected light according to a voltage application condition of the optical modulation device according to the comparative example of FIG. 3.

Referring to FIG. 4, a reflection phase (°) is changed according to a voltage. The reflection phase (°) may be changed by up to about 270°, and may be difficult to be changed by more than about 270°. Accordingly, there is a limitation that all phases may not be represented. Due to the limitation, noise may be increased during light wave steering, that is, beam steering.

Figure 5:
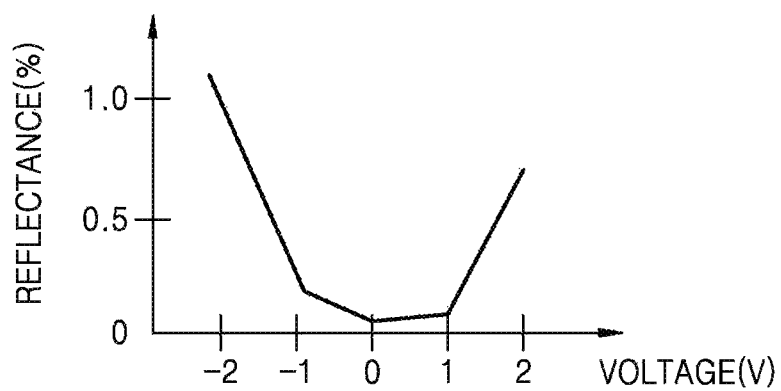
FIG. 5 is a graph showing a change in a reflectance according to a voltage application condition of the optical modulation device according to the comparative example of FIG. 3.

FIG. 5 is a graph showing a change in a reflectance according to a voltage application condition of the optical modulation device according to the comparative example of FIG. 3.

Referring to FIG. 5, it is found that a reflectance (%) is greatly changed according to a voltage. Since the reflectance (%) is different for each voltage, distortion occurs at a wave front of a generated light wave. As a result, noise is increased when the light wave is steered. Once noise is increased, energy of a main lobe may be reduced, a monitoring distance may be reduced, and light reflected by a beam steered to an undesired direction may cause information distortion. Such a change in the reflectance (%) may occur since an amplitude is also changed when a phase of a reflected wave is changed.

Figure 6:
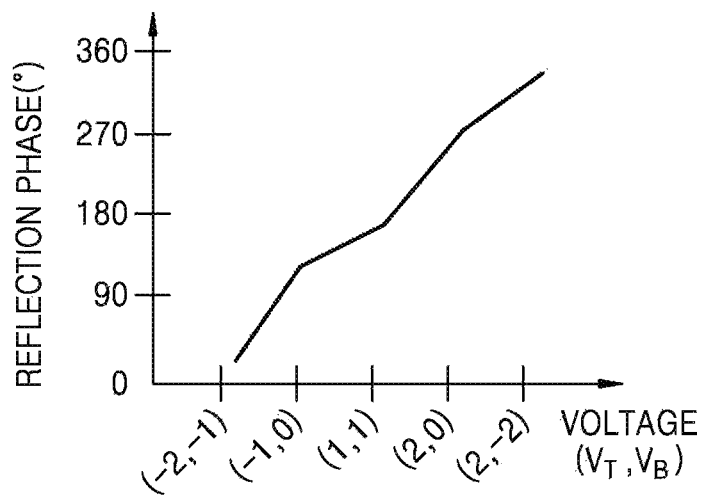
FIG. 6 is a graph showing a phase change of reflected light according to a voltage application condition of the optical modulation device of FIG. 1.

FIG. 6 is a graph showing a phase change of reflected light according to a voltage application condition of the optical modulation device of FIG. 1.

Referring to FIG. 6, since a voltage may be independently applied to the nano-antenna N10 that is located over the conductor C10 and the conductor C10 that is located under the nano-antenna N10, the horizontal axis represents a combination of an upper voltage VT and a lower voltage VB. According to the present exemplary embodiment, a reflection phase (°) may be changed by up to 360° according to a voltage condition, unlike in the comparative example of FIG. 4 where a reflection phase (°) is changed by up to 270°.

Figure 7:
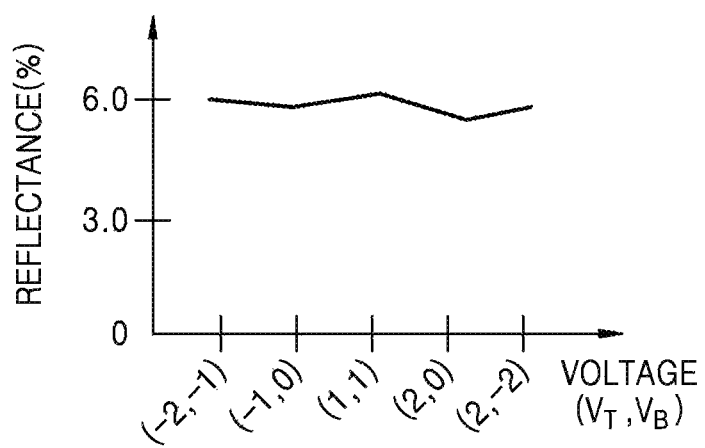
FIG. 7 is a graph showing a change in a reflectance according to a voltage application condition of the optical modulation device of FIG. 1.

FIG. 7 is a graph showing a change in a reflectance according to a voltage application condition of the optical modulation device of FIG. 1.

Referring to FIG. 7, a reflectance (%) may be maintained at a near constant level while a reflection phase (°) is changed according to a voltage condition. For example, within a measurement range, the amount of change in the reflectance (%) may be about ±15% or less, unlike in the comparative example of FIG. 5 where a reflectance (%) is greatly changed. Also, it is found that an average reflectance (%) of FIG. 7 is much higher than a maximum reflectance (%) of FIG. 5.

As shown in FIGS. 6 and 7, according to the present exemplary embodiment, since the reflection phase (°) may be changed by up to 360° and the reflectance (%) may be maintained at a near constant level, efficiency during light wave steering, that is, beam steering, may be increased, noise may be reduced, and distortion may be suppressed. Accordingly, optical modulation using, in particular, a constant amplitude method, a) $2\pi(360°)$-full coverage method, and a phase-only modulation method may be easily performed.

Figure 8:
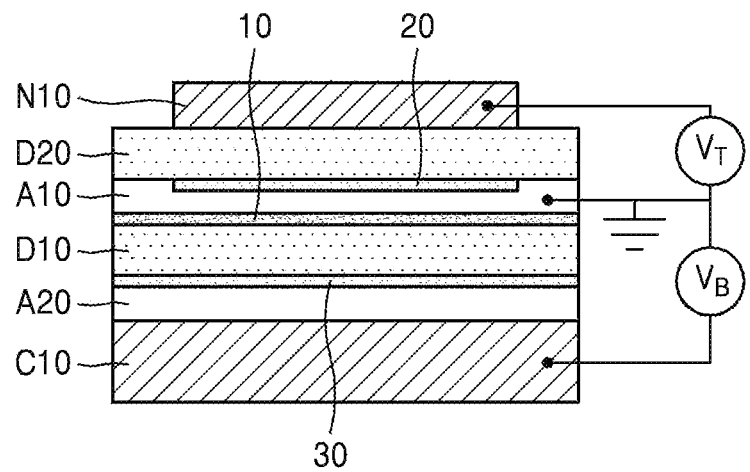
FIG. 8 is a cross-sectional view of an optical modulation device according to another exemplary embodiment.

FIG. 8 is a cross-sectional view of an optical modulation device according to another exemplary embodiment.

Referring to FIG. 8, the optical modulation device may further include a second active layer A20 located between the conductor C10 and the first dielectric layer D10 and electrically contacting the conductor C10. In this case, the active layer A10 located between the first dielectric layer D10 and the second dielectric layer D20 may be referred to as a first active layer A10. The second active layer A20 may be formed of a material that is the same as or similar to that of the first active layer A10. The second active layer A20 may include a third charge concentration varying region 30 whose charge concentration is changed due to a voltage applied between the conductor C10 and the first active layer A10 by the first voltage applying unit VB. The third charge concentration varying region 30 may be located adjacent to the first dielectric layer D10. In the present exemplary embodiment, the first charge concentration varying region 10 and the third charge concentration varying region 30 may be respectively formed in the first active layer A10 and the second active layer A20 by the first voltage applying unit VB, and the second charge concentration varying region 20 may be formed in the first active layer A10 by the second voltage applying unit VT. Other elements may be the same as or similar to those of FIG. 1 except that the second active layer A20 including the third charge concentration varying region 30 is further provided.

Since a change in characteristics of the first through third charge concentration varying regions 10, 20, and 30 is used in optical modulation in the present exemplary embodiment, optical modulation characteristics may be improved and may be easily controlled.

Figure 9:
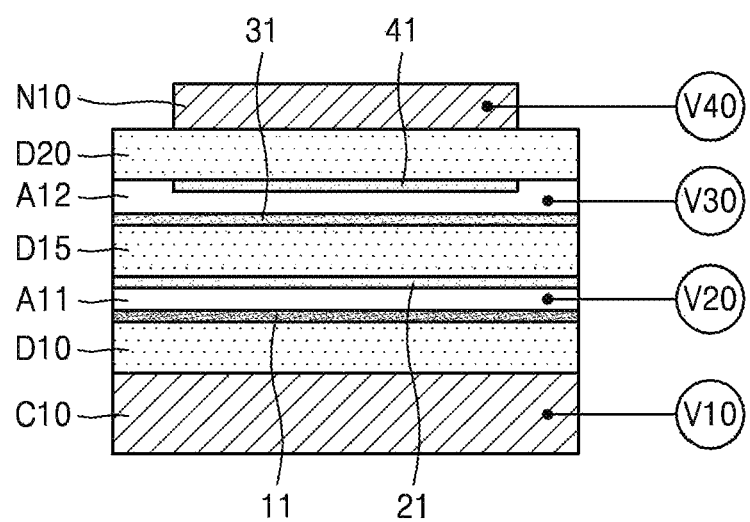
FIG. 9 is a cross-sectional view of an optical modulation device according to another exemplary embodiment.

FIG. 9 is a cross-sectional view of an optical modulation device according to another exemplary embodiment.

Referring to FIG. 9, at least two active layers may be located between the first dielectric layer D10 and the second dielectric layer D20. In FIG. 9, two active layers A11 and A12 are provided. The two active layers A11 and A12 may be referred to as a first active layer A11 and a second active layer A12. An intermediate dielectric layer D15 may be located between the first and second active layers A11 and A12 that are adjacent to each other. Each of the first and second active layers A11 and A12 may be formed of a material that is the same as or similar to that of the active layer A10 of FIG. 1, and the intermediate dielectric layer D15 may be formed of a material that is the same as or similar to that of each of the first and second dielectric layers D10 and D20. The first and second active layers A11 and A12 may be formed of the same material or different materials.

The optical modulation device according to the present exemplary embodiment may include a first voltage applying unit V10 for applying a voltage to the conductor C10, a second voltage applying unit V20 for applying a voltage to the first active layer A11, a third voltage applying unit V30 for applying a voltage to the second active layer A12, and a fourth voltage applying unit V40 for applying a voltage to the nano-antenna N10. Accordingly, a voltage may be independently applied to each of the conductor C10, the first active layer A11, the second active layer A12, and the nano-antenna N10. One of the first active layer A11 and the second active layer A12 may be grounded.

A first charge concentration varying region 11 and a second charge concentration varying region 21 may be respectively formed in a lower portion and an upper portion of the first active layer A11. Likewise, a third charge concentration varying region 31 and a fourth charge concentration varying region 41 may be respectively formed in a lower portion and an upper portion of the second active layer A12. The first charge concentration varying region 11 may be formed due to a potential difference between the conductor C10 and the first active layer A11, the second and third charge concentration varying regions 21 and 31 may be formed due to a potential difference between the first active layer A11 and the second active layer A12, and the fourth charge concentration varying region 41 may be formed due to a potential difference between the second active layer A12 and the nano-antenna N10.

Since a change in characteristics of the first through fourth charge concentration varying regions 11, 21, 31, and 41 is used in optical modulation in the present exemplary embodiment, optical modulation characteristics may be improved and may be easily controlled. Although not shown in FIG. 9, three or more active layers may be located between the first dielectric layer D10 and the second dielectric layer D20, and an intermediate dielectric layer may be located between adjacent active layers of the three or more active layers.

Figure 10:
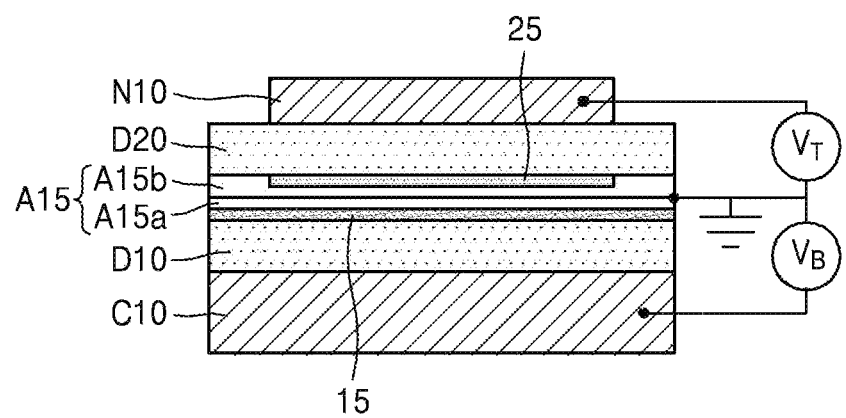
FIG. 10 is a cross-sectional view of an optical modulation device according to another exemplary embodiment.

FIG. 10 is a cross-sectional view of an optical modulation device according to another exemplary embodiment.

Referring to FIG. 10, one active layer A15 may have a multi-layer structure. For example, the active layer A15 may have a multi-layer structure including a lower layer A15a and an upper layer A15b. The lower layer A15a and the upper layer A15b may include different materials or may have different doping characteristics. A first charge concentration varying region 15 may be formed in the lower layer A15a, and a second charge concentration varying region 25 may be formed in the upper layer A15b. When the lower layer A15a and the upper layer A15b include different materials or have different doping characteristics, characteristics of the first and second charge concentration varying regions 15 and 25 may be controlled differently from that used to control characteristics of the first and second charge concentration varying regions 10 and 20 of FIG. 1. The active layer A15 may have a multi-layer structure including three or more layers. A configuration of the active layer A15 except that the active layer A15 has a multi-layer structure may be the same as or similar to that in FIG. 1. The active layer A15 of FIG. 10 may be applied to the optical modulation devices of FIGS. 2, 8, and 9. Also, at least a part of a structure of FIG. 8 and at least a part of a structure of FIG. 9 may be combined in one device.

A thickness of each of the active layers A10, A11, A12, A15, and A20 of FIGS. 1, 2, and 8 through 10 may be equal to or less than hundreds of nanometers (nm), for example, equal to or less than about 300 nm. The active layers A10, A11, A12, A15, and A20 may each have a small thickness, for example, a thickness equal to or less than about 50 nm, about 30 nm, or about 10 nm. For example, when the active layer A10 of FIG. 1 has a small thickness, an interval between the first charge concentration varying region 10 and the second charge concentration varying region 20 may be reduced, and thus optical modulation characteristics may be improved and may be easily controlled. A thickness of each of the first dielectric layer D10, the second dielectric layer D20, and the intermediate dielectric layer D15 may range, for example, but is not limited to, from about several nm to hundreds of nm. Also, thicknesses of the first dielectric layer D10, the second dielectric layer D20, and the intermediate dielectric layer D15 may be different from one another.

Figure 11:
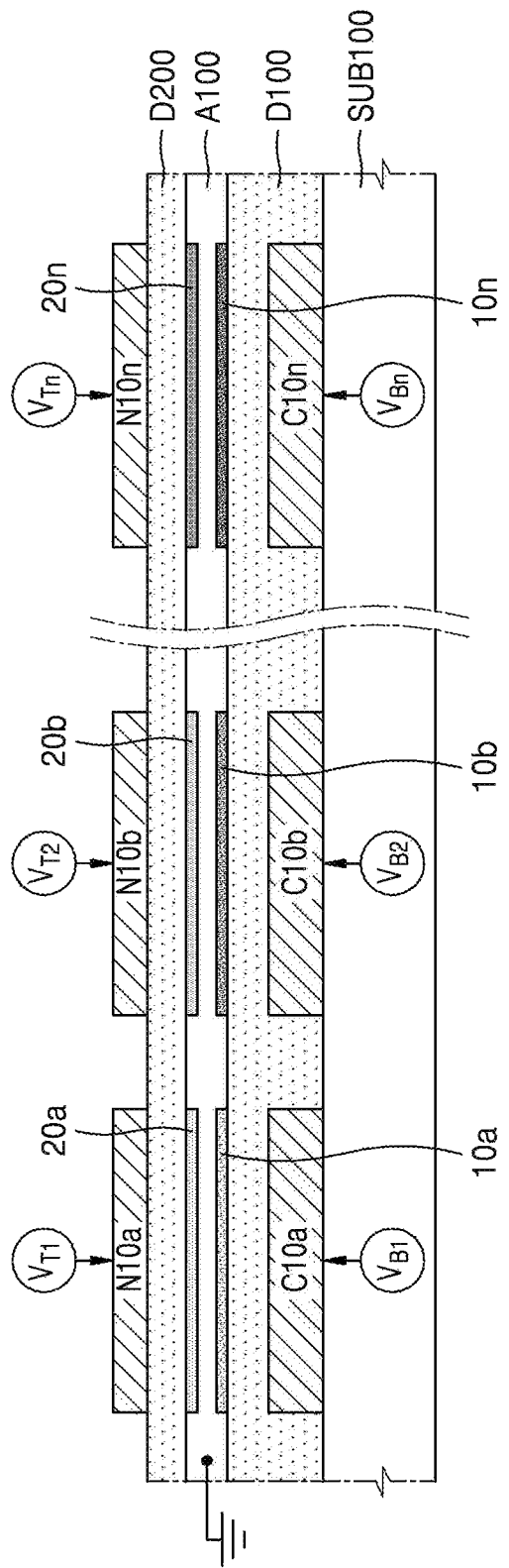
FIG. 11 is a cross-sectional view of an optical modulation device according to another exemplary embodiment.
Figure 12:
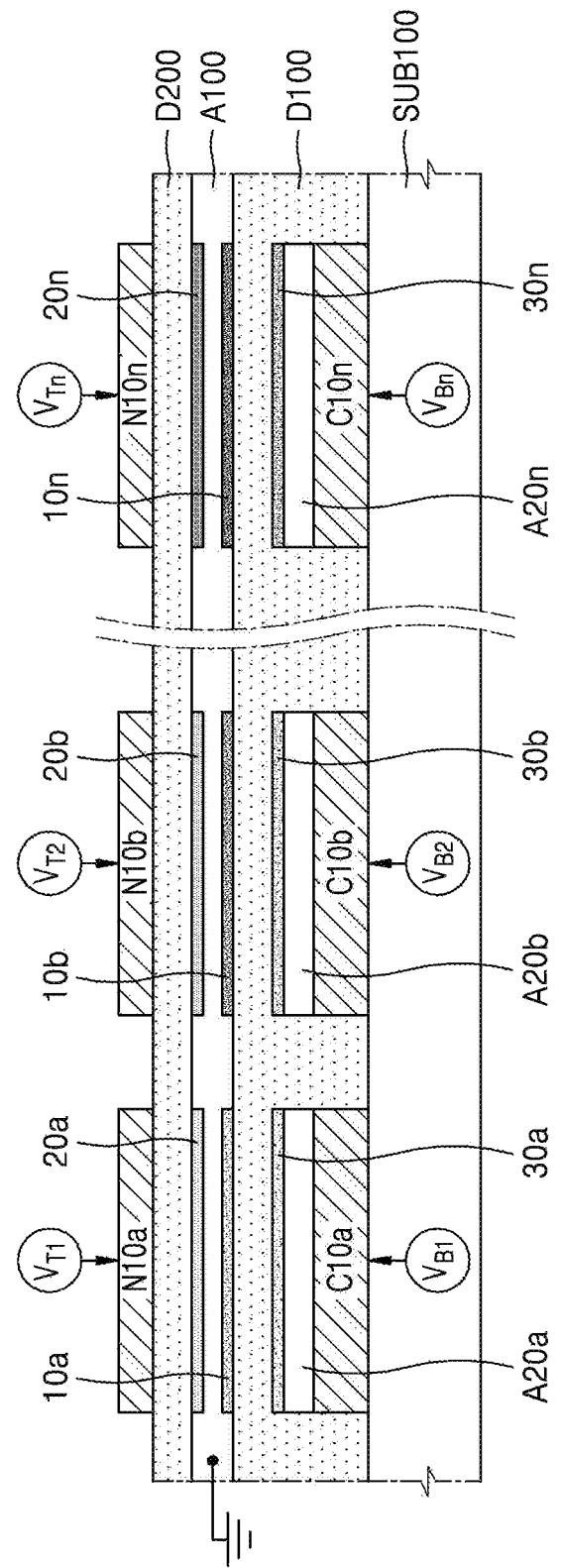
FIG. 12 is a cross-sectional view of an optical modulation device according to another exemplary embodiment.
Figure 13:
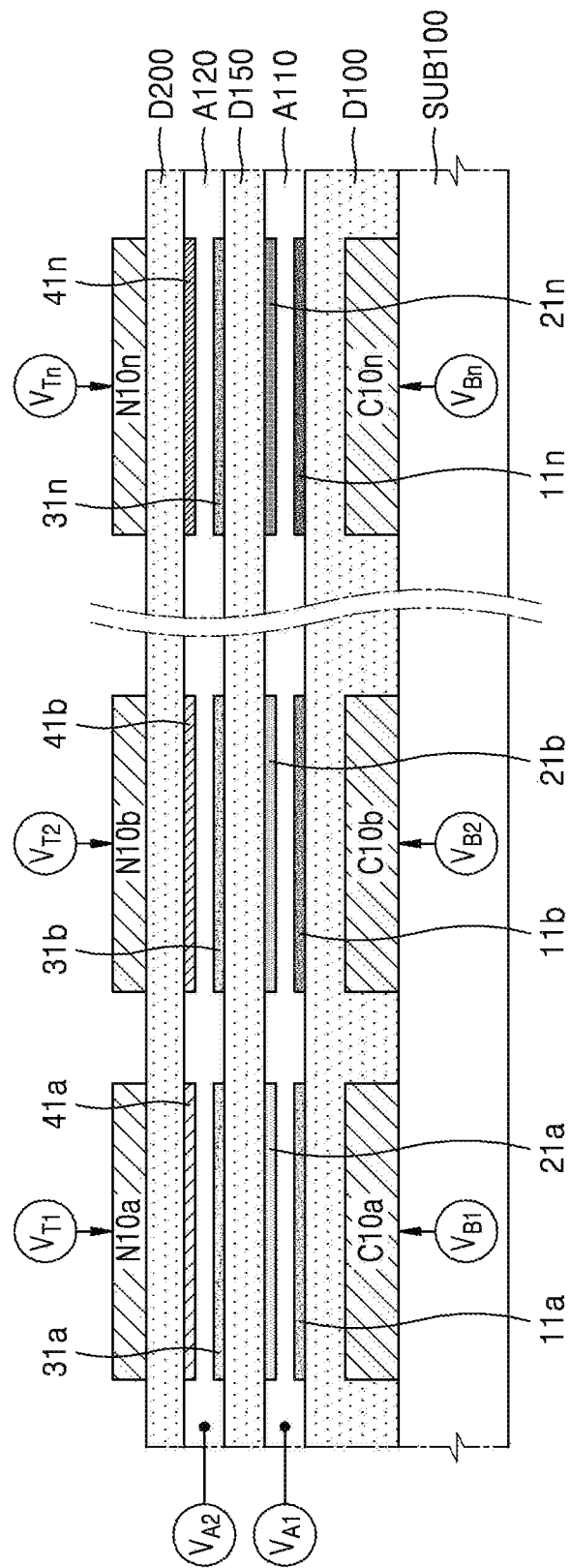
FIG. 13 is a cross-sectional view of an optical modulation device according to another exemplary embodiment.

When the optical modulation device described with reference to each of FIGS. 1, 2, 8, and 10 is defined as a "unit device", a plurality of the unit devices may constitute an array structure, as shown in FIGS. 11 through 13, for example.

FIG. 11 is a cross-sectional view of an optical modulation device according to another exemplary embodiment.

Referring to FIG. 11, a plurality of conductors C10a, C10b, and C10n may be arranged on a substrate SUB100 and spaced apart from one another, and a first dielectric layer D100 that covers the plurality of conductors C10a, C10b, and C10n may be provided. An active layer A100 may be located on the first dielectric layer D100, and a second dielectric layer D200 may be located on the active layer A100. A plurality of nano-antennas N10a, N10b, and N10n may be arranged on the second dielectric layer D200 and spaced apart from one another and respectively facing the plurality of conductors C10a, C10b, and C10n.

A "signal applying unit" configured to independently apply an electrical signal to each of the plurality of conductors C10a, C10b, and C10n and each of the plurality of nano-antennas N10a, N10b, and N10n may be provided. The signal applying unit may be a voltage applying unit. Voltages VB1, VB2, and VBn may be respectively independently applied to the plurality of conductors C10a, C10b, and C10n, and apart from this, voltages VT1, VT2, and VTn may be respectively independently applied to the plurality of nano-antennas N10a, N10b, and N10n. In this case, the active layer A100 may be grounded.

A plurality of first charge concentration varying regions 10a, 10b, and 10n may be formed in the active layer A100 due to the voltages VB1, VB2, and VBn respectively independently applied to the plurality of conductors C10a, C10b, and C10n. A plurality of second charge concentration varying regions 20a, 20b, and 20n may be formed in the active layer A100 due to the voltages VT1, VT2, and VTn respectively independently applied to the plurality of nano-antennas N101a, N10b, and N10n. The plurality of first charge concentration varying regions 10a, 10b, and 10n may be located adjacent to the first dielectric layer D100, and the plurality of second charge concentration varying regions 20a, 20b, and 20n may be located adjacent to the second dielectric layer D200. Charge concentrations of the plurality of first charge concentration varying regions 10a, 10b, and 10n and the plurality of second charge concentration varying regions 20a, 20b, and 20n may be independently controlled.

One conductor (e.g., C10a) and a nano-antenna (e.g., N10a) corresponding to the conductor, and the active layer A100 located between the conductor C10a and the nano-antenna N10a may constitute one unit device, for example, a unit cell, and a plurality of the unit cells may be arranged in the optical modulation device. Different voltages may be applied to at least two of the plurality of conductors C10a, C10b, and C10n, and apart from this, different voltages may be applied to at least two of the plurality of nano-antennas N10a, N10b, and N10n. Voltages applied to any one of the plurality of conductors C10a, C10b, and C10n and a nano-antenna corresponding to the conductor may be different from each other. Phase modulation of light occurring due to each of the plurality of unit devices may be independently controlled. A direction of a beam output from the plurality of unit devices may be steered by appropriately controlling phase modulation of light by the plurality of unit devices. For example, when phase modulations occurring in a plurality of unit devices arranged in a first direction are controlled to be sequentially reduced by $\pi/2$ in the first direction, a direction of light reflected by the plurality of unit devices may be controlled (steered) to a specific direction, which may be referred to as beam steering using an optical phased array method. A steering direction of a beam may be adjusted in any of various ways by adjusting a phase transition rule of a phased array.

Although reflected light is steered to one direction in the above description, predetermined beam shaping may be performed by steering light to different directions according to areas. For example, the optical modulation device may include a plurality of areas having a plurality of cells, and beam shaping into a desired shape may be performed by steering a beam to different directions according to the plurality of areas.

According to the present exemplary embodiment, phase modulations of light occurring in the plurality of unit devices (cells), in other words, in the plurality of nano-antennas N10a, N10b, and N10n may be up to 360°. Also, even when a phase is changed, a reflectance (%) by each of the plurality of unit devices (cells) may be maintained at a near constant and high level. Accordingly, optical modulation efficiency may be improved, and noise and distortion may be reduced/prevented.

FIG. 12 is a cross-sectional view of an optical modulation device according to another exemplary embodiment.

Referring to FIG. 12, a plurality of second active layers A20a, A20b, and A20n respectively contacting the plurality of conductors C10a, C10b, and C10n may be further located between the plurality of C10a C10, and C10n and the first dielectric layer D100. In other words, the plurality of second active layers A20a, A20b, and A20n respectively contacting the plurality of conductors C10a, C10b, and C10n may be provided, and the first dielectric layer D100 may cover the plurality of conductors C10a, C10b, and C10n and the plurality of second active layers A20a, A20b, and A20n. Third charge concentration varying regions 30a, 30b, and 30n may be respectively formed in the plurality of second active layers A20a, A20b, and A20n. Each of the second active layers A20a, A20b, and A20n and each of the third charge concentration varying regions 30a, 30b, and 30n may respectively correspond to the second active layer A20 and the third charge concentration varying region 30 of FIG. 8.

FIG. 13 is a cross-sectional view of an optical modulation device according to another exemplary embodiment.

Referring to FIG. 13, at least two active layers may be located between the first dielectric layer D100 and the second dielectric layer D200. In FIG. 13, two active layers, that is, first and second active layers A110 and A120, are provided, and an intermediate dielectric layer D150 is further located between the first and second active layers A110 and A120 in FIG. 13.

A first active layer voltage VA1 may be applied to the first active layer A110, and a second active layer voltage VA2 may be applied to the second active layer A120. Any one of the first and second active layers A110 and A120 may be grounded. The voltages VB1, VB2, and VBn may be respectively independently applied to the plurality of conductors C10a, C10b, and C10n, and apart from this, the voltages VT1, VT2, and VTn may be respectively independently applied to the plurality of nano-antennas N10a, N10b, and N10n. A plurality of first charge concentration varying regions 11a, 11b, and 11n and a plurality of second charge concentration varying regions 21a, 21b, and 21n may be formed in the active layer A110. A plurality of third charge concentration varying regions 31a, 31b, and 31n and a plurality of fourth charge concentration varying regions 41a, 41b, and 41n may be formed in the second active layer A120. A unit structure of FIG. 13 may correspond to or may be similar to a structure of FIG. 9.

The optical modulation device according to the present exemplary embodiment may include a plurality of unit devices that are arranged in a one-dimensional (1D) or two-dimensional (2D) manner. A case in which a plurality of unit devices are arranged in a 1D manner is illustrated in FIG. 14, and a case in which a plurality of unit devices are arranged in a 2D manner is illustrated in FIG. 15.

Figure 14:
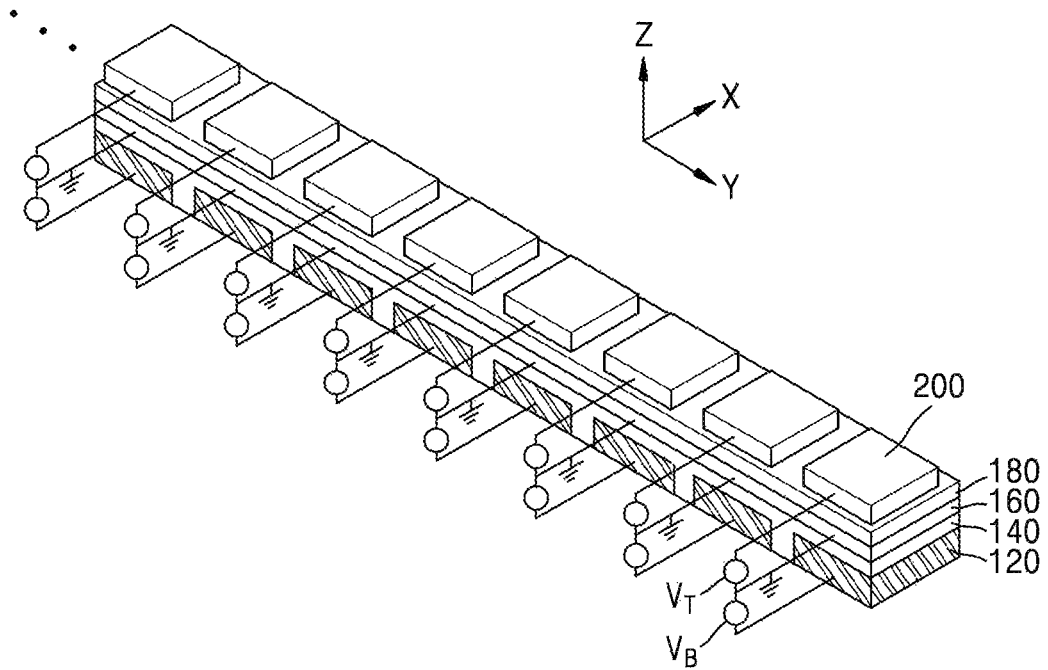
FIG. 14 is a perspective view of an optical modulation device according to another exemplary embodiment.
Figure 15:
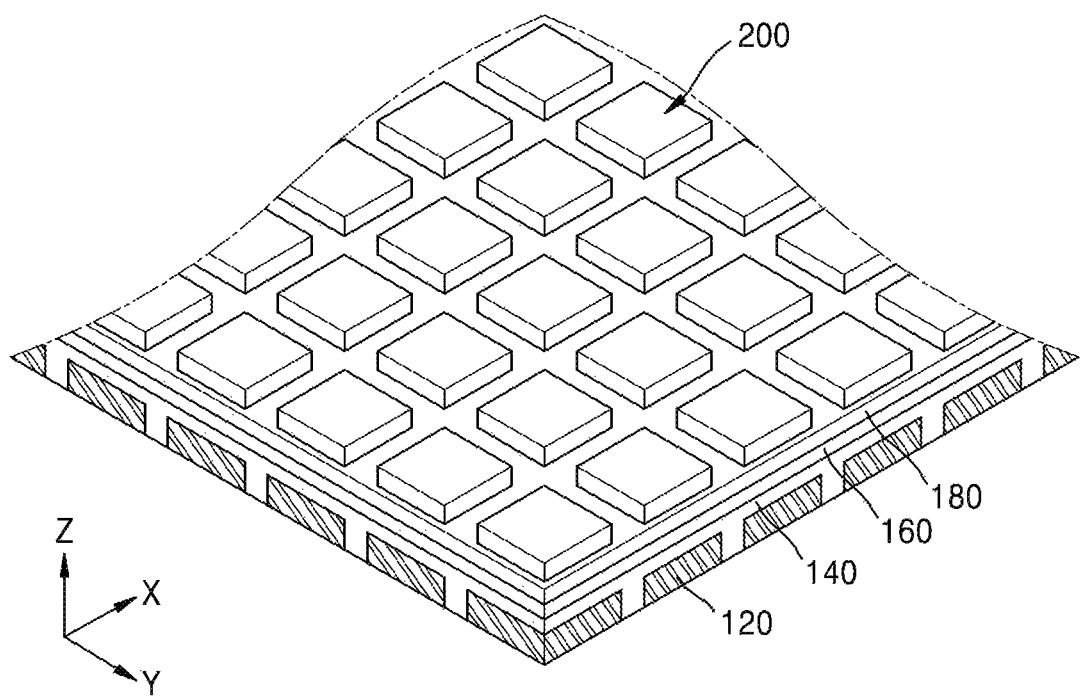
FIG. 15 is a perspective view of an optical modulation device according to another exemplary embodiment.

Referring to FIG. 14, a plurality of conductors (conductive elements) 120 may be arranged in a 1D manner and spaced apart from one another in a first direction, e.g., a Y-axis direction, and a plurality of nano-antennas 200 may respectively face the plurality of conductors 120. An active layer 160 may be located between the plurality of conductors 120 and the plurality of nano-antennas 200 to be spaced apart from the plurality of conductors 120 and the plurality of nano-antennas 200. A first dielectric layer 140 may be located between the plurality of conductors 120 and the active layer 160, and a second dielectric layer 180 may be located between the active layer 160 and the plurality of nano-antennas 200.

A voltage applying unit for independently applying a voltage to each of the plurality of conductors 120 and each of the plurality of nano-antennas 200 may be provided. For example, the voltage applying unit may include the first voltage applying unit VB for applying a voltage between each conductor 120 and the active layer 160, and a second voltage applying unit VT for applying a voltage between each nano-antenna 200 and the active layer 160. The active layer 160 may be grounded.

It may be stated that the optical modulation device according to the present exemplary embodiment corresponds to a case in which a plurality of unit devices of FIG. 1 are arrayed in a 1D manner. In this case, an apparatus for steering a beam to a 1D direction may be realized. In other words, a steering direction of a beam by a combination of the plurality of unit devices may be controlled in a 1D manner by differently controlling optical modulation (phase modulation) characteristics occurring in the plurality of unit devices.

Referring to FIG. 15, the plurality of conductors (conductive elements) 120 may be arranged in a 2D manner and spaced apart from one another, for example, in X and Y-axis directions. The first dielectric layer 140 that covers the plurality of conductors 120 may be provided, the active layer 160 may be located on the first dielectric layer 140, and the second dielectric layer 180 may be located on the active layer 160. The plurality of nano-antennas 200 may be located on the second dielectric layer 180. The plurality of nano-antennas 200 may face the plurality of conductors 120.

Although not shown in FIG. 15, a voltage applying unit for independently applying a voltage to each of the plurality of conductors 120 may be provided. Also, a voltage applying unit for independently applying a voltage to each of the plurality of nano-antennas 200 may be provided. In this case, the active layer 160 may be grounded.

It may be stated that the optical modulation device according to the present exemplary embodiment corresponds to a case in which a plurality of unit devices of FIG. 1 are arranged in a 2D manner. In this case, an apparatus for steering a beam in a 2D direction may be realized. In other words, a steering direction of a beam by a combination of the plurality of unit devices may be controlled in a 2D manner by differently controlling optical modulation (phase modulation) characteristics occurring in the plurality of unit devices.

In FIG. 15, the plurality of nano-antennas 200 may extend (continuously extend) in a predetermined direction, e.g., in the X-axis direction. Also, the plurality of conductors 120 may extend (continuously extend) in a predetermined direction, e.g., in the X-axis direction, as shown in FIG. 16, for example.

Figure 16:
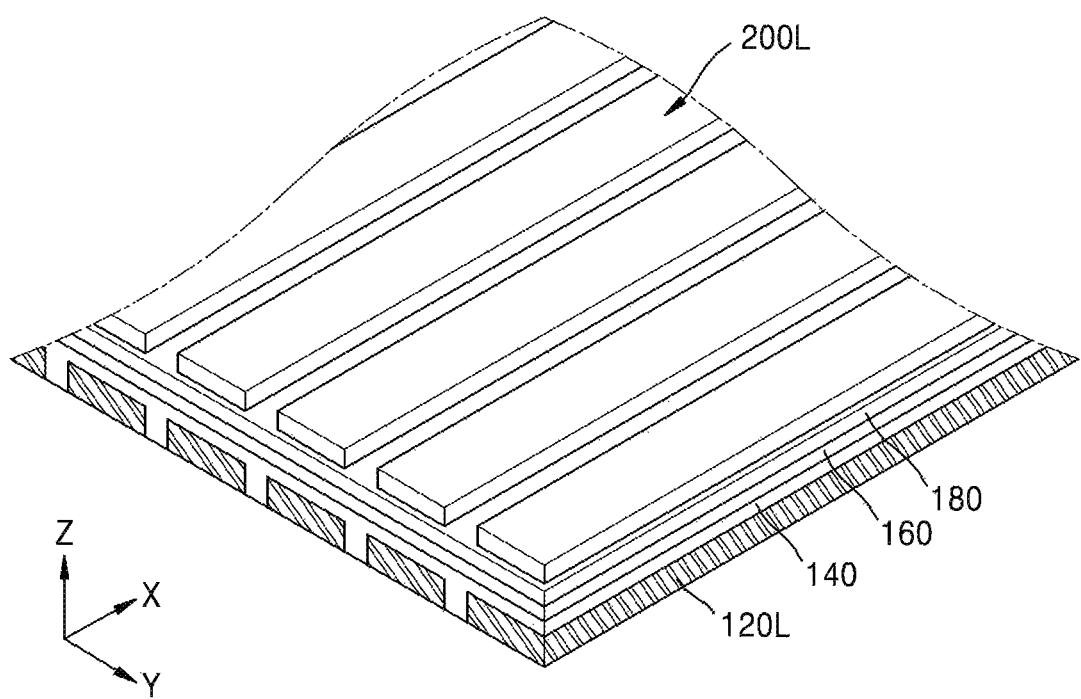
FIG. 16 is a perspective view of an optical modulation device according to another exemplary embodiment.

Referring to FIG. 16, a plurality of conductors 120L may be arranged to be spaced apart from one another. The plurality of conductors 120L may extend in the X-axis direction, and may be spaced apart from one another in the Y-axis direction. The first dielectric layer 140 that covers the plurality of conductors 120L may be provided, the active layer 160 and the second dielectric layer 180 may be sequentially stacked on the first dielectric layer 140, and a plurality of nano-antennas 200L may be located on the second dielectric layer 180. The plurality of nano-antennas 200L may extend in the X-axis direction and may be spaced apart from one another in the Y-axis direction, like the plurality of conductors 120L.

Figure 17:
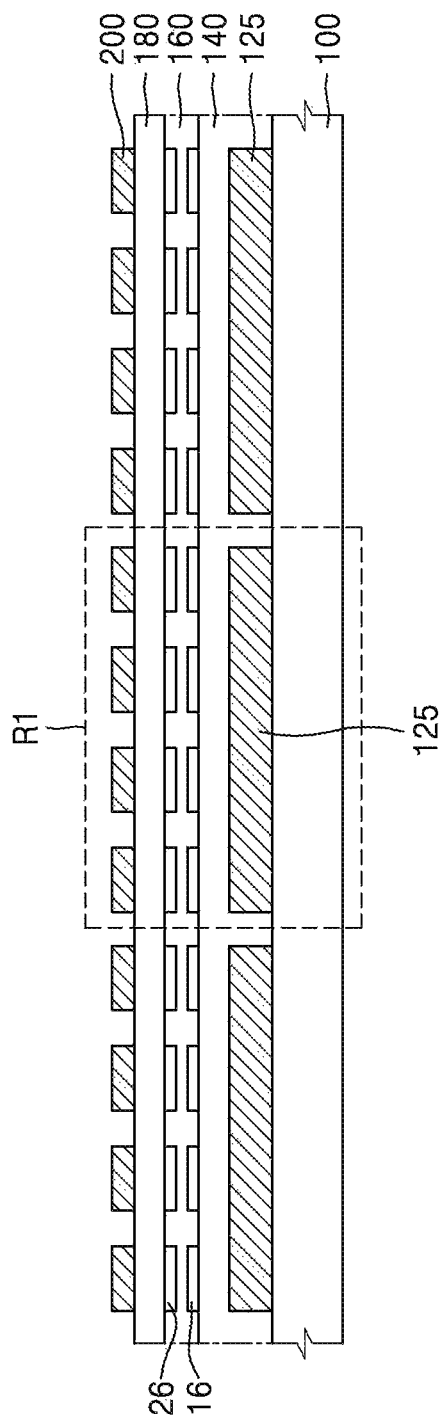
FIG. 17 is a cross-sectional view of an optical modulation device according to another exemplary embodiment.

Although one nano-antenna is provided to correspond to one conductor (conductive element) in the above exemplary embodiments, according to other exemplary embodiments, a plurality of nano-antennas may be provided to correspond to one conductor (conductive element), as exemplarily shown in FIG. 17.

Referring to FIG. 17, a plurality of conductors (conductive elements) 125 may be located on a substrate 100 and spaced apart from one another. The first dielectric layer 140 that covers the plurality of conductors 125 may be provided, and the active layer 160 and the second dielectric layer 180 may be sequentially stacked on the first dielectric layer 140. The plurality of nano-antennas 200 may be located on the second dielectric layer 180. Two or more nano-antennas 200 may be located to correspond to one conductor 125. Accordingly, each conductor 125 may have a size (e.g., a width) large enough to cover two or more nano-antennas 200.

A voltage applying unit (not shown) for independently applying a voltage to each of the plurality of conductors 125 and each of the plurality of nano-antennas 200 may be provided. The active layer 160 may be grounded. Alternatively, another voltage applying unit for applying a predetermined voltage to the active layer 160 may be further provided. A plurality of first charge concentration varying regions 16 may be formed in a first layer portion (e.g., a lower layer portion) of the active layer 160, and a plurality of second charge concentration varying regions 26 may be formed in a second layer portion (an upper layer portion) of the active layer 160.

One conductor 125, two or more nano-antennas 200 corresponding to the one conductor 125, and portions between the one conductor and the two or more nano-antennas 200 may constitute one unit region R1. In each conductor 125, a portion of each conductor 125 corresponding to the nano-antenna 200 may function as an effective electrode portion. Accordingly, the first charge concentration varying region 16 may be formed in a portion corresponding to the effective electrode portion. In one unit region R1, a voltage may be applied to the conductor 125 and different voltages may be applied to two or more nano-antennas 200. Also, the voltages applied to the two or more nano-antennas 200 may be different from the voltage applied to the conductor 125.

Figure 18:
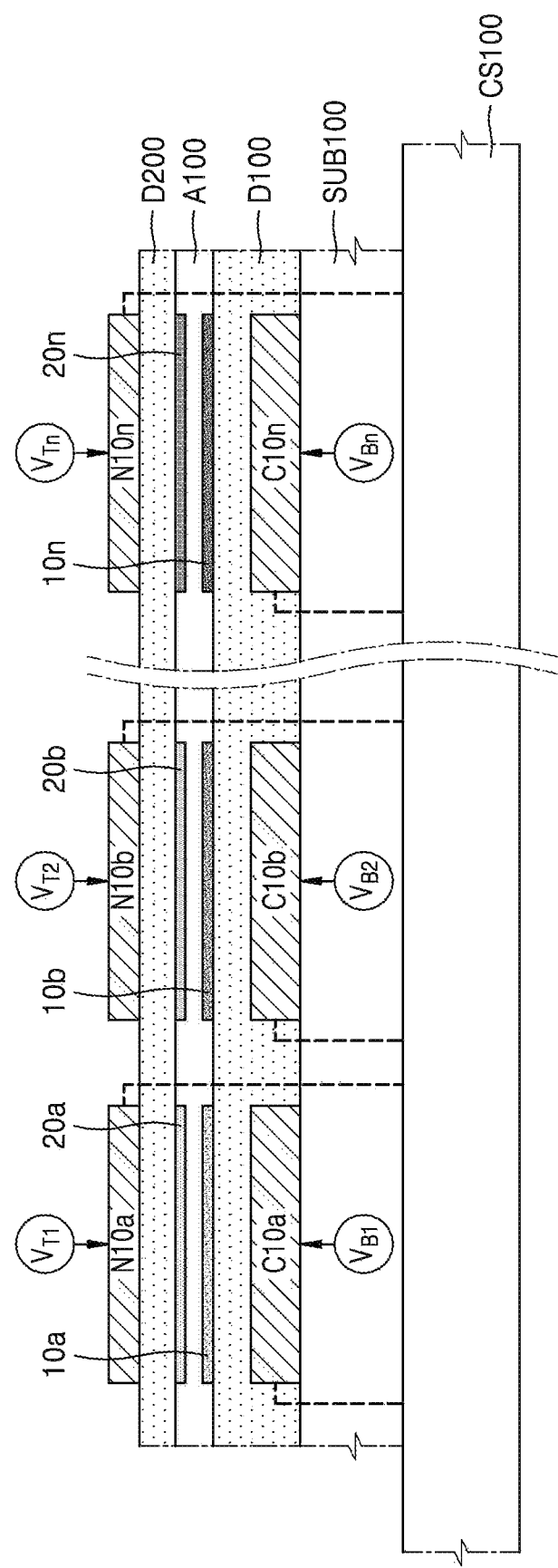
FIG. 18 is a cross-sectional view of an optical modulation device according to another exemplary embodiment.

FIG. 18 is a cross-sectional view of an optical modulation device according to another exemplary embodiment.

Referring to FIG. 18, a circuit substrate (circuit board) CS100 may be provided, and an optical modulation device structure according to exemplary embodiments, for example, a device structure of FIG. 11, may be located on the circuit substrate CS100. A signal applying unit for applying an electrical signal to each of the plurality of conductors C10a, C10b, and C10n and each of the plurality of nano-antennas N10a, N10b, and N10n may be formed in the circuit substrate CS100. The signal applying unit may be a voltage applying unit. In detail, the circuit substrate CS100 may be divided into a plurality of cell regions, and each of the cell regions may have any of various configurations such as a 1T (transistor)-1C (capacitor) configuration, a 2T-1C configuration, or a 2T-2C configuration. A circuit of the circuit substrate CS100 may be electrically connected to each of the plurality of conductors C10a, C10b, and C10n and each of the plurality of nano-antennas N10a, N10b, and N10n. Such electrical connection may be formed by using a bonding wire or a connection wiring using a via-hole used in various semiconductor devices. Although the active layer A100 may be grounded, a separate voltage applying unit for applying a predetermined voltage to the active layer A100 may be further provided in the circuit substrate CS100. The substrate SUB100 may be omitted.

Although each nano-antenna is simply illustrated in the above exemplary embodiments, a structure of the nano-antenna may be changed in any of various ways.

FIGS. 19A, 19B, 19C, and 19D are perspective views illustrating various structures/shapes of a nano-antenna applicable to an optical modulation device according to exemplary embodiments.

Figure 19A:
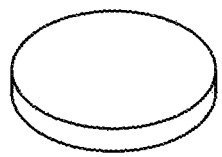
FIGS. 19A, 19B, 19C, and 19D is a perspective view illustrating various structures/shapes of a nano-antenna applicable to an optical modulation device according to exemplary embodiments.
Figure 19B:
Figure 19C:
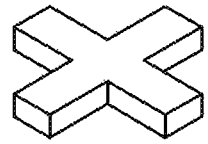
Figure 19D:
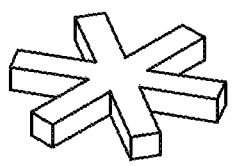

A nano-antenna may have any of various structures/shapes such as a circular disk type (FIG. 19A), an elliptical disk type (FIG. 19A B), a cross type (FIG. 19A C), or an asterisk type (FIG. 19A D). The cross type (FIG. 19A C) may be a type in which two nano-rods perpendicularly intersect each other, and the asterisk type (FIG. 19A D) may be an asterisk (*) type in which three nano-rods cross one another. Although not shown in the figures, the nano-antenna may have any of various other modified structures such as a cone type, a triangular pyramid type, a spherical type, a hemispherical type, a rice grain type, a rod type, a fish-bone type, or another type as would be understood by one of skill in the art. Also, the nano-antenna may have a multi-layer structure in which a plurality of layers are stacked, and may have a core-shell structure including a core portion and at least one shell portion. In addition, nano-antennas having two or more different structures/shapes may constitute one unit and may be periodically arranged.

A resonance wavelength, a resonance wavelength width, resonance polarization characteristics, a resonance angle, and reflection/absorption/transmission characteristics may be changed according to a structure/type and an arrangement of nano-antennas. Accordingly, an optical modulation device having desired characteristics may be manufactured by controlling a structure/type and an arrangement of nano-antennas.

A device for steering a beam to a predetermined direction may be realized by using the optical modulation device of any of the above exemplary embodiments.

Figure 20:
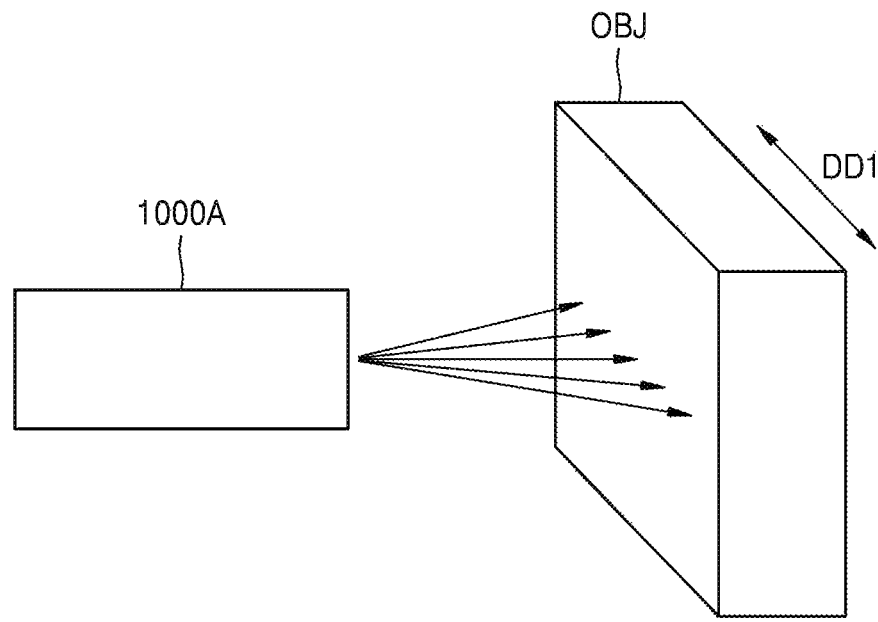
FIG. 20 is a conceptual view for explaining a beam steering device including an optical modulation device according to an exemplary embodiment.

FIG. 20 is a conceptual view for explaining a beam steering device 1000A including an optical modulation device according to an exemplary embodiment.

Referring to FIG. 20, a beam may be steered to a 1D direction by using the beam steering device 1000A. For example, a beam may be steered toward a predetermined object OBJ in a first direction DD1. The beam steering device 1000A may include a 1D array of optical modulation devices according to exemplary embodiments.

Figure 21:
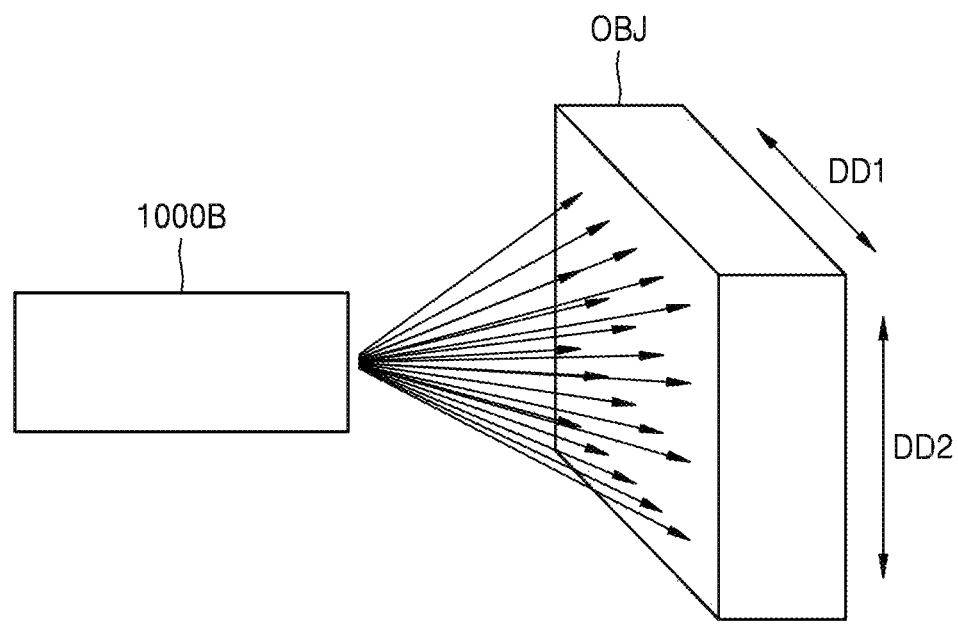
FIG. 21 is a conceptual view for explaining a beam steering device including an optical modulation device according to another exemplary embodiment.

FIG. 21 is a conceptual view for explaining a beam steering device 1000B including an optical modulation device according to another exemplary embodiment.

Referring to FIG. 21, a beam may be steered to a 2D direction by using the beam steering device 1000B. For example, a beam may be steered toward the object OBJ in the first direction DD1 and a second direction DD2 that is perpendicular to the first direction DD1. The beam steering device 1000B may include a 2D array of optical modulation devices according to exemplary embodiments.

Figure 22:
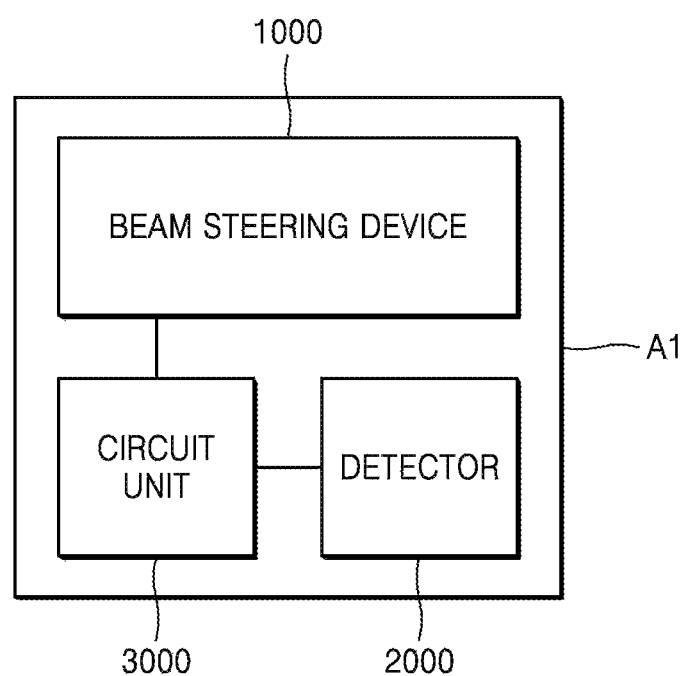
FIG. 22 is a block diagram for explaining an overall system of an optical apparatus including a beam steering device using an optical modulation device according to an exemplary embodiment.

FIG. 22 is a block diagram for explaining an overall system of an optical apparatus A1 including a beam steering device 1000 using an optical modulation device according to an exemplary embodiment.

Referring to FIG. 22, the optical apparatus A1 may include the beam steering device 1000. The beam steering device 1000 may include the optical modulation device described with reference to any of FIGS. 1, 2, and 8 through 19. The optical apparatus A1 may include a light source unit in the beam steering device 1000, or may include a light source unit separate from the beam steering device 1000. The optical apparatus A1 may include a detector 2000 for detecting light steered by the beam steering device 1000 and reflected by an object (not shown). The detector 2000 may include a plurality of light detection elements, and may further include other optical members. Also, the optical apparatus A1 may further include a circuit unit 3000 connected to at least one of the beam steering device 1000 and the detector 2000. The circuit unit 3000 may include a calculator for obtaining and calculating data, and may further include a driver and a controller. Also, the circuit unit 3000 may further include a power supply unit and a memory.

Although the optical apparatus A1 includes the beam steering device 1000 and the detector 2000 in FIG. 22, the beam steering device 1000 and the detector 2000 may be separately provided in different apparatuses instead of being provided in one apparatus. Also, the circuit unit 3000 may be connected to the beam steering device 1000 or the detector 2000 through wireless communication, instead of by wire. A configuration of FIG. 22 may be changed in any of various other ways.

The beam steering device according to the above exemplary embodiments may be applied to various optical apparatuses. For example, the beam steering device may be applied to a light detection and ranging (LiDAR) apparatus. The LiDAR apparatus may be an apparatus using a phase-shift method or a time-of-flight (TOF) method. The LiDAR apparatus may be applied to an autonomous vehicle, a flying object such as a drone, a mobile device, a small vehicle (e.g., a bicycle, a motorcycle, a stroller, or a board), a robot, a human/animal assistive device (e.g., a cane, a helmet, an accessory, a garment, a watch, or a bag), an Internet of things (IoT) apparatus/system, and a security apparatus/system.

Figure 23:
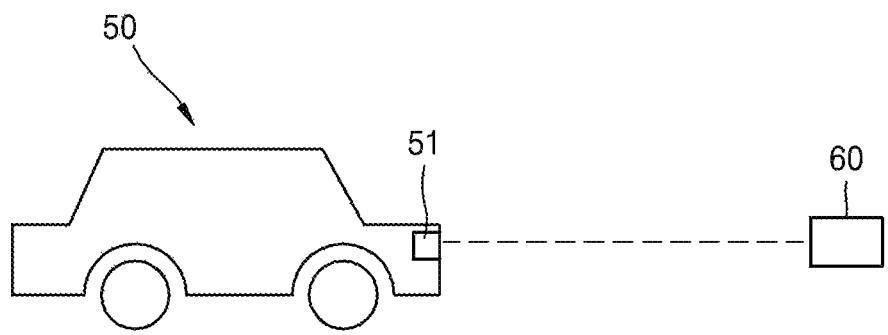
FIGS. 23 and 24 are conceptual views illustrating a case where a light detection and ranging (LiDAR) apparatus including an optical modulation device is applied to a vehicle according to an exemplary embodiment.
Figure 24:
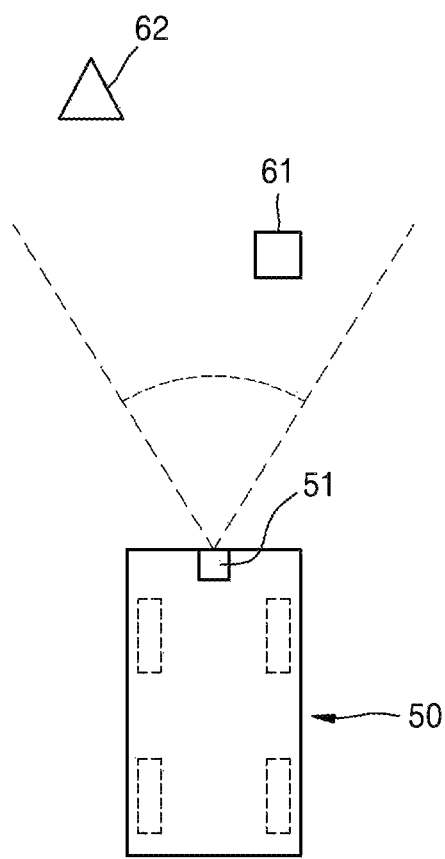

FIGS. 23 and 24 are conceptual views illustrating a case in which a LiDAR apparatus 51 including an optical modulation device is applied to a vehicle 50 according to an exemplary embodiment. FIG. 23 is a side view and FIG. 24 is a top view.

Referring to FIG. 23, the LiDAR apparatus 51 may be applied to the vehicle 50, and information about an object 60 may be obtained by using the LiDAR apparatus 51. The vehicle 50 may be a vehicle having a self-driving function. The object 60, e.g., solid matter or a person, located in a direction in which the vehicle 50 travels may be detected by using the LiDAR apparatus 51. Also, a distance to the object 60 may be measured by using information such as a time difference between a transmission signal and a detection signal. Also, as shown in FIG. 24, information about a near object 61 and a far object 62 located within a scan range may be obtained.

The optical modulation device according to various embodiments may be applied to various optical apparatuses as well as the LiDAR apparatus. For example, since three-dimensional (3D) information of an object and a space may be obtained through scanning by using the optical modulation device according to various embodiments, the optical modulation device may be applied to a 3D image acquisition apparatus or a 3D camera. Also, the optical modulation device may be applied to a holographic display apparatus and a structured light generating apparatus. Also, the optical modulation device may be applied to any of various beam scanning apparatuses, hologram generating apparatuses, optical coupling apparatuses, and various optical components/apparatuses such as varifocal lenses. Also, the optical modulation device may be applied to any of various fields using a "meta-surface" or a "meta-structure". In addition, the optical modulation device and the optical apparatus including the same according to exemplary embodiments may be applied to any of various optical and electronic devices for any of various purposes.

Although many exemplary embodiments have been described in detail, the embodiments should be construed as just examples. For example, it will be understood by one of ordinary skill in the art that a configuration of the optical modulation device of any of FIGS. 1, 2, and 8 through 19D may be modified in various ways. In detail, the active layer of FIG. 11 and the like may be used as a plurality of active layer elements by being patterned and an electrical signal (e.g., voltage) may be independently applied to each of the active layer elements. Also, it will be understood that an optical modulation device according to exemplary embodiments may be applied to a transflective device or a transmissive device as well as a reflective device. Also, applications of the optical modulation device according to exemplary embodiments are not limited thereto and may be modified in various ways. Accordingly, the scope of the present disclosure is defined not by the exemplary embodiments but by the technical sprit and scope of the following claims.

What is claimed is:

1. An optical modulation device comprising:
   a nano-antenna;
   a conductor;
   an active layer disposed between the nano-antenna and the conductor, wherein at least one property of the active layer is variable based on a voltage applied thereto;
   a first dielectric layer disposed between the active layer and the conductor;
   a second dielectric layer disposed between the active layer and the nano-antenna; and
   a signal applying unit configured to independently apply a first voltage to the conductor and apply a second voltage that is different from the first voltage to the non-antenna.

2. The optical modulation device of claim 1, wherein the signal applying unit comprises:
   a first voltage applying unit configured to apply the first voltage between the conductor and the active layer; and
   a second voltage applying unit configured to apply the second voltage between the active layer and the nano-antenna.

3. The optical modulation device of claim 1, wherein the signal applying unit is configured to apply a third voltage to the active layer.

4. The optical modulation device of claim 3, wherein the third voltage is a reference voltage for the first voltage and the second voltage.

5. The optical modulation device of claim 3, wherein the third voltage is a ground voltage.

6. The optical modulation device of claim 1, wherein the active layer comprises a first charge concentration varying region and a second charge concentration varying region, wherein the first charge concentration varying region and the second charge concentration varying region are formed by an electrical signal applied to the active layer by the signal applying unit, and
   wherein the first charge concentration varying region is adjacent to the first dielectric layer, and the second charge concentration varying region is adjacent to the second dielectric layer.

7. The optical modulation device of claim 1, wherein the conductor is a back reflector electrode disposed under the active layer.

8. The optical modulation device of claim 1, wherein the conductor is a metal layer.

9. The optical modulation device of claim 1, wherein the active layer is a first active layer, and the optical modulation device further comprises a second active layer disposed between the conductor and the first dielectric layer, wherein the second active layer electrically contacts the conductor.

10. The optical modulation device of claim 1, wherein the active layer is a first active layer, and the optical modulation device further comprises:
    a second active layer disposed between the first dielectric layer and the second dielectric layer; and
    an intermediate dielectric layer disposed between the first active layer and the second active layer.

11. The optical modulation device of claim 1, wherein the active layer comprises a lower active layer and an upper active layer, and
    wherein one of a material of the lower layer and doping characteristics of the lower layer is different from a material of the upper layer and doping characteristics of the upper layer, respectively.

12. The optical modulation device of claim 1, wherein the conductor, the first dielectric layer, the active layer, the second dielectric layer, and the nano-antenna constitute one unit device, and
    wherein the optical modulation device comprises a plurality of the unit devices.

13. The optical modulation device of claim 12, wherein the plurality of unit devices are arranged in one of a one-dimensional (1D) array and a two-dimensional (2D) array.

14. The optical modulation device of claim 1, wherein the nano-antenna comprises a plurality of the nano-antennas corresponding to the conductor.

15. The optical modulation device of claim 1, wherein the active layer comprises an electro-optic material and a permittivity of the electro-optic material varies according to an electrical signal applied by the signal applying unit to the active layer.

16. The optical modulation device of claim 1, wherein the active layer comprises at least one of a transparent conductive oxide and a transition metal nitride.

17. The optical modulation device of claim 1, wherein at least one of the first dielectric layer and the second dielectric layer comprises at least one of an insulating silicon compound and an insulating metal compound.

18. The optical modulation of claim 1, wherein the optical modulation device is configured to change a reflection phase of incident light by increasing the first voltage at a same time while decreasing the second voltage, or by decreasing the first voltage at a same time while increasing the second voltage.

19. The optical modulation device of claim 1, wherein the optical modulation device is configured to change a reflection phase of incident light by up to 360°.

20. An optical apparatus comprising the optical modulation device of claim 1.

21. The optical apparatus of claim 20, wherein the optical modulation device is configured to steer a beam in one of a one-dimensional (1D) manner and two-dimensional (2D) manner.

22. The optical apparatus of claim 20, wherein the optical apparatus comprises at least one of a light detection and ranging (LiDAR) apparatus, a three-dimensional (3D) image acquisition apparatus, a holographic display apparatus, and a structured light generating apparatus.

23. An optical modulation device comprising:
a nano-antenna;
a conductor;
an active layer disposed between the nan-antenna and the conductor, wherein at least one property of the active layer is variable based on a voltage applied thereto;
a first dielectric layer dispose between the active layer and the conductor;
a second dielectric layer disposed between the active layer and he nano-antenna; and
a signal applying unit configured to independently apply an electrical signal to at least two of the nano-antenna, the active layer, and the conductor, wherein the conductor comprises a plurality of the conductors spaced apart from one another, and the nano-antenna comprises a plurality of nano-antennas are spaced apart from one another.

24. The optical modulation device of claim 1, wherein the optical modulation device is configured to induce a phase modulation of light reflected by the nano-antenna.

25. The optical modulation device of claim 23, wherein the signal applying unit is configured to apply different voltages to at least two of the plurality of conductors, and to apply different voltages to at least two of the plurality of nano-antennas.

26. The optical modulation device of claim 23, wherein the signal applying unit is configured to apply voltages independently to each of the plurality of conductors, and to apply voltages independently to each of the plurality of nano-antennas.

27. An optical modulation device comprising:
a plurality of conductive elements spaced apart from one another;
a plurality of nano-antennas facing the plurality of conductive elements;
an active layer disposed between the plurality of conductive elements and the plurality of nano-antennas, wherein the active layer is spaced apart from the plurality of conductive elements and from the plurality of nano-antennas and wherein at least one property of the active layer is variable based on a voltage applied thereto; and
a voltage applying unit configured to independently apply a voltage to each of the plurality of conductive elements and to each of the plurality of nano-antennas,
wherein the voltage independently applied to each of the plurality of conductive elements causes a change in a charge concentration occurring in a first region of the active layer and the voltage independently applied to each of the plurality of nano-antennas causes a change in a charge concentration occurring in a second region of the active layer, the change in the charge concentration occurring in the first region and the change in the charge concentration occurring in the second region modulating light incident on the optical modulation device.

28. The optical modulation device of claim 27, wherein the voltage applying unit is further configured to apply different voltages to at least two of the plurality of conductive elements, and, independently, apply different voltages to at least two of the plurality of nano-antennas.

29. The optical modulation device of claim 27, wherein the plurality of conductive elements comprises a first conductive element and a second conductive element, and
the plurality of nano-antennas comprises a first nano-antenna corresponding to the first conductive element and a second nano-antenna corresponding to the second conductive element,
wherein the voltage applying unit is further configured to independently apply a voltage to each of the first conductive element, the first nano-antenna, the second conductive element, and the second nano-antenna.

30. The optical modulation device of claim 27, further comprising:
a first insulating layer disposed between the plurality of conductive elements and the active layer; and
a second insulating layer disposed between the plurality of nano-antennas and the active layer.

31. The optical modulation device of claim 27, wherein the plurality of nano-antennas are arranged in a one-dimensional (1D) array, and
wherein the optical modulation device is configured to one-dimensionally steer light incident thereon.

32. The optical modulation device of claim 27, wherein the plurality of nano-antennas are arranged in a two-dimensional (2D) array, and
wherein the optical modulation device is configured to two-dimensionally steer light incident thereon.

33. An optical apparatus comprising the optical modulation device of claim 27.

* * * * *